United States Patent
Gamer et al.

(10) Patent No.: US 8,473,736 B2
(45) Date of Patent: Jun. 25, 2013

(54) METHOD FOR MAKING SECURITY MECHANISMS AVAILABLE IN WIRELESS MESH NETWORKS

(75) Inventors: Thomas Gamer, Oftersheim (DE); Christian Schwingenschlögl, Putzbrunn (DE); Michael Bahr, München (DE); Lars Völker, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 0 days.

(21) Appl. No.: 13/125,207

(22) PCT Filed: Oct. 27, 2009

(86) PCT No.: PCT/EP2009/007707
§ 371 (c)(1),
(2), (4) Date: Nov. 21, 2011

(87) PCT Pub. No.: WO2010/049138
PCT Pub. Date: May 6, 2010

(65) Prior Publication Data
US 2012/0066492 A1    Mar. 15, 2012

(30) Foreign Application Priority Data

Oct. 27, 2008  (DE) .......................... 10 2008 053 409
Oct. 27, 2008  (EP) ..................................... 08018760

(51) Int. Cl.
*H04L 29/06*   (2006.01)
*H04W 84/02*   (2009.01)
*H04W 40/00*   (2009.01)

(52) U.S. Cl.
USPC ............................ 713/156; 370/328; 370/392

(58) Field of Classification Search
USPC .................................. 713/156; 370/328, 392
See application file for complete search history.

(56) References Cited

U.S. PATENT DOCUMENTS 7,362,709 B1    4/2008   Hui et al.
2003/0108029 A1    6/2003   Behzadi
(Continued)

FOREIGN PATENT DOCUMENTS
EP           1724991 B1     12/2008

OTHER PUBLICATIONS

Written Opinion of the International Searching Authority for PCT/EP2009/007707 dated Jan. 11, 2010 (Form PCT/ISA/237) (English Translation).

(Continued)

*Primary Examiner* — Brandon Hoffman
*Assistant Examiner* — Samuel Ambaye
(74) *Attorney, Agent, or Firm* — Buchanan Ingersoll & Rooney PC

(57) ABSTRACT

A method for making safety mechanisms available in wireless mesh networks which have a plurality of nodes that are interconnected by multi-hop communication in a wireless network meshed by mesh routing in the MAC layer, every node being active as a router to forward the data traffic of the other nodes. At least two differentiated levels of confidence are defined by a type of protection (ToP) the value of which represents a specific level of confidence for the nodes and data packets, the data packets being labeled with a ToP value in the mesh header, and at least one ToP value being allocated to the participating nodes, the nodes forwarding the data packet in the mesh network using the ToP values of the node and of the data packet if this ToP value combination is admissible in the node.

21 Claims, 4 Drawing Sheets

U.S. PATENT DOCUMENTS

| | | | |
|---|---|---|---|
| 2005/0014510 A1* | 1/2005 | Jeon | 455/452.2 |
| 2008/0062984 A1* | 3/2008 | Emeott et al. | 370/392 |
| 2009/0003291 A1* | 1/2009 | Chu et al. | 370/338 |

OTHER PUBLICATIONS

International Preliminary Report on Patentability for PCT/EP2009/007707 dated May 3, 2011 (Form PCT/IP/373, PCT/ISA/237) (GermanTranslation).

International Preliminary Report on Patentability for PCT/EP2009/007707 dated May 3, 2011 (Form PCT/IP/373, PCT/ISA/237) (English Translation).

International Search Report for PCT/EP2009/007707 dated Jan. 11, 2010 (Form PCT/ISA/210) (German Translation).

International Search Report for PCT/EP2009/007707 dated Jan. 11, 2010 (Form PCT/ISA/210) (English Translation).

Written Opinion of the International Searching Authority for PCT/EP2009/007707 dated Jan. 11, 2010 (Form PCT/ISA/210) (German Translation).

"Extensible Authentication Protocol (EAP)" http://tools.ietf.org/html/rfc3748; B. Adoba, L. Blunk, J. Vollbrecht, J. Carlson, H. Levkowetz; Jun. 2004.

"Remote Authentication Dial in User Service (RADIUS)" http://tools.ietf.org/html/rfc2865; C. Riney, S. Willens, A. Rubens, W. Simpson; Jun. 2000.

* cited by examiner

| Octets: | 1 | 1 | 3 | 0, 6, 12, or 18 | 1 |
|---|---|---|---|---|---|
| | Mesh Flags | Mesh Time to Live (TTL) | Mesh Sequence Number | Mesh Address Extension (optional) | Mesh ToP |

METHOD FOR MAKING SECURITY MECHANISMS AVAILABLE IN WIRELESS MESH NETWORKS

CROSS-REFERENCE TO RELATED APPLICATIONS

This application is the United States national phase under 35 U.S.C. §371 of PCT International Patent Application No. PCT/EP2009/007707, filed on Oct. 27, 2009, and claiming priority to European Application No. 08018760.2 filed on Oct. 27, 2008, and German Application No. 10 2008 053 409.9, filed on Oct. 27, 2008.

BACKGROUND OF THE INVENTION

1. Field of the Invention

Embodiments of the invention relate to a method for making security mechanisms available in wireless mesh networks.

2. Background of the Related Art

A wireless network is a network in which data are transmitted according to the Wireless Local Area Network (WLAN) standard. Equally valid access points are used in the IEEE 802.11 WLAN standard family. Depending on the network configuration, some of them allow a transfer to a backbone network. One access point and the stations to which it transmits form a wireless cell. Most WLAN installations are operated in infrastructure mode, wherein the stations in a wireless cell can communicate with other stations, or with devices reachable through the backbone network, only through the access point. The individual wireless cells are linked to each other by the backbone network, creating an overlapping WLAN. Until now, backbone networks have primarily been cabled networks, typically an Ethernet LAN.

The upcoming IEEE 802.11s standard is an expansion, with which wireless cells will no longer need the backbone network in the cable network. The result of this is a mesh WLAN, in which the connection between access points is now also wireless and fully transparent for the stations. The mesh network operates as a self-organizing network, building itself dynamically from the participating nodes. Each participating node also functions as a router, using the routing protocol, and forwards the data traffic on to other nodes. Unlike the single-hop communication used by IEEE 802.11 WLANs, IEEE 802.11s mesh WLANs use routing mechanisms on the MAC layer to permit multi-hop communication.

When WLANs are used in businesses, these networks must be secured by encryption measures. In addition to authentication, security against eavesdropping and invasion is an important requirement. In the IEEE Standards for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment 6: Medium Access Control (MAC) Security Enhancements, 2004 it is stated that the IEEE 802.11i standard defines some new WLAN Security Mechanisms and introduces the Robust Secure Network (RSN) protocol for establishing a secure connection with an Access Point. RSN is used for resistance against external attacks such as eavesdropping, data alteration, and data insertion, and provides effective access control as well as cryptographic data protection.

The use of group keys in IEEE 802.11i, with which data traffic between nodes is secured against eavesdropping by encrypting it, wherein a group key is used for communication with multiple other nodes, cannot guarantee sufficient protection against data alteration or interception by other subscribers on the network, i.e., internal attackers, because of the multi-hop data forwarding. If we also consider possible attacks at the routing level, such as intentional disruption of data traffic or retargeting of routing paths by other subscribers on the mesh network, it is clear that even using different keys in pairs is not enough, and the existing mechanisms are either too complex, extremely expensive, or inadequate for the protection needed in mesh networks.

A suggestion for implementing a currency system in order to promote cooperation, especially for forwarding foreign data packets, is included in Levente Buttyán, Jean-Pierre Hubaux. Nuglets: a Virtual Currency to Stimulate Cooperation in Self-Organized Mobile Ad Hoc Networks, 2001, and is intended to prevent network subscribers from behaving selfishly, i.e., intentionally intercepting packets that are supposed to be forwarded onward and thereby disrupting or even completely preventing communication between other subscribers. It rewards correct forwarding of foreign traffic by then allowing one's own traffic to be sent over the network. However, such a solution is difficult to implement in mesh networks, due to the varying availability of nodes, and requires an extremely high expense when a fair cost model is calculated.

An older method for protecting networks against external attacks is Wired Equivalent Privacy (WEP). However, WEP has a lot of security gaps and is therefore no longer used. In 802.11i and previously, these problems are not even mentioned, since attacks by selectively disrupting packets to be forwarded, as well as the use of multi-hop environments, had not yet been considered.

Security mechanisms at management level, described in Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment: Protected Management Frames, D1.0, 2006, and also at routing level, such as Secure OLSR, described in Thomas Clausen, Emmanuel Baccelli, Securing OLSR Problem Statement, LIX, Ecole Polytechnique, 2005, or SAODV, described in Manel Guerrero Zapata, Secure Ad hoc On-Demand Distance Vector (SAODV) Routing, Technical University of Catalonia (UPC), 2005, for protection of routing protocols, assume an existing key distribution and administration system and also cannot prevent other manipulations and attacks by legitimate network subscribers.

BRIEF SUMMARY OF THE INVENTION

We provide the methods and arrangements for making security mechanisms available in wireless mesh networks that provide increased security in wireless mesh networks in keeping with the current state of the art.

To increase security in wireless mesh networks, embodiments use differentiated confidence levels defined by a Type of Protection or ToP. Embodiments may encompass both the mechanism by which data packets are marked with a ToP value and the fact that the ToP value is transported in the mesh network such that each participating node in the mesh network receives at least one assigned ToP value. In the mesh network nodes, for each incoming data packet, it is then determined whether the ToP values of the node match the ToP value of the data packet. The node also tests to see whether the target or recipient address of the MAC layer (L2) corresponds to its own address. The routing mechanisms are therefore enhanced by the use of ToP values. If this ToP value combination is allowed in the node, the data packet can be processed by that node and forwarded on to another node with a corresponding ToP value. If this ToP value combination is not allowed in the node, then the data packet cannot be processed by that node and cannot be forwarded on to another node with a corresponding ToP value. Data traffic routing is controlled by means of this differentiation, and the incidence of attacks such as selective forwarding is thereby reduced.

LIST OF REFERENCE NUMBERS

Figure 1:
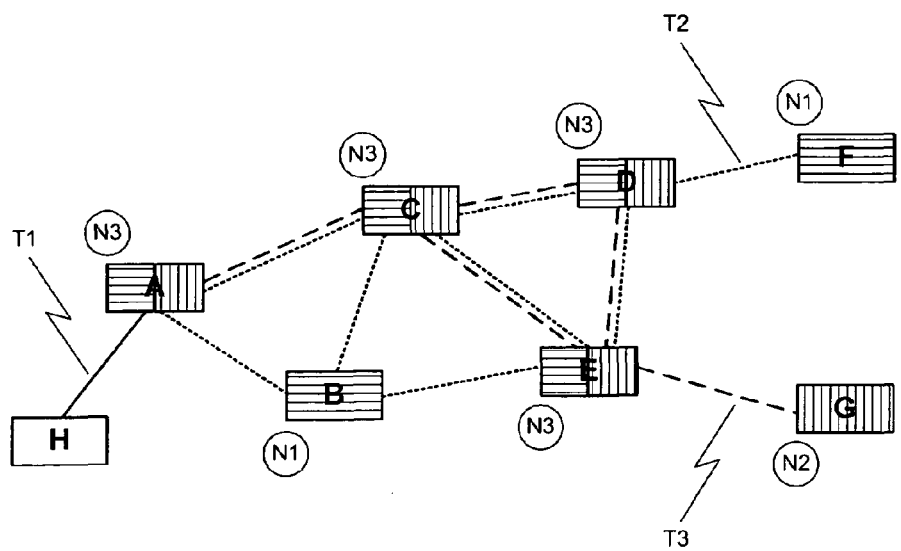
FIG. 1 shows mesh nodes with different confidence levels and an authentication server.

A-G Nodes
H Authentication server
N1 Nodes with the Visitor ToP
N2 Nodes with the Employee ToP
N3 Nodes with the Employee ToP and additionally the Visitor ToP
T1 Authentication
T2 Data traffic with the Visitor ToP
T3 Data traffic with the Employee ToP

DETAILED DESCRIPTION OF THE INVENTION

Confidence level differentiation cannot prevent malicious internal nodes within those same confidence levels from carrying out successful attacks, but by differentiating between confidence levels, the number of possible malicious internal nodes is reduced to a minimum, and internal nodes are prevented from carrying out successful attacks outside of their confidence level.

The Mesh Flags field in the mesh header of a data packet, available per standard IEEE 802.11s, is used according to the invention to define an additional ToP flag. This ToP flag indicates that the Mesh ToP field, with a size of one octet, follows the Mesh Address Extension field. This Mesh ToP field is introduced according to the invention and is used to store the ToP value of the data packet. Anchoring the ToP value in the mesh header for transport in the IEEE 802.11s mesh network makes it possible for the ToP value of the data packet to be read by all nodes in between so that the correct forwarding decisions can be made.

In another solution, the ToP value can be transported in an additional header inserted above or below the MAC header.

With the multi-hop communication on the MAC layer, the 4-address frame format is used for the mesh frame, wherein the ToDS and FromDS flags are set at a value of 1 in the Frame Control field. This guarantees that only mesh-enabled nodes will process the additional mesh header at the beginning of the body frame with user data located in it. Legacy nodes according to the IEEE 802.11 standard, which do not possess the necessary capabilities for mesh networks and the expansions, simply recognize an invalid ToDS/FromDS combination and reject the data packet.

The ToP value can be set depending on information from the application layer of the subscriber or the network layer in the node. One solution consists of using ToP values such as VLAN tags and assigning different ToP confidence levels to different IP address areas. The ToP is inserted in the data packet by a routing function in the originating node, for example, and is transparent for the application. In another solution, the application for a subscriber it itself capable of selecting the corresponding ToP value and inserting it in the data packet. In a further solution, the value of the IP Type of Service field can be considered by means of a network function in the originating node.

In each node, a forwarding table is inserted for each associated ToP value and lists the ToP values of the nodes that can be trusted. This reveals the confidence relationships between nodes and allows for the corresponding routing.

For data packet routing in the mesh network, a Path Selection Protocol is defined that uses the ToP values from the forwarding tables and their confidence relationships.

An authentication server, which can be reached from the network and is approved for initial authentication of the network-compatible nodes, assigns one or more confidence levels to each participating node, which are represented by one or more ToP values stored in the forwarding tables. For the various ToP values of the nodes, various traffic classes are defined in the network at the same time and used to separate the data traffic by means of the Path Selection Protocol.

The ToP value transported in a data packet on the mesh network is read by the participating nodes and forwarded to a node with an associated ToP value that corresponds to that of the first node. This allocation of data packet ToPs to participating nodes makes separation of data traffic and routing to various confidence levels possible and prevents selective forwarding of data packets.

Introducing confidence level differentiation in mesh networks also requires an appropriate metric. Very fine-grained splitting into different ToPs makes the network fragile, i.e., the data packets are forwarded only via nodes with the same ToPs, which makes the number of possible routes very small or partitions the network. The invention therefore proposes the use of hierarchical ToP mapping. With hierarchical arrangement of the confidence levels, a load comparison can be made and partitioning of the network can be avoided.

In a ToP mapping system with fully classified confidence levels, packets with a low confidence level can be processed by every node in the mesh network, because the nodes with a higher confidence level also include the lower confidence levels.

In a ToP mapping system with partially classified confidence levels, partial confidence level areas for the nodes are fully classified, so that the packets in these areas are processed as described above. However, packets with the corresponding confidence level cannot be exchanged between different areas with the same confidence level values.

In a ToP mapping system with unclassified confidence levels, packets with the corresponding confidence level can be exchanged between two nodes with the same confidence level values, but packets with a lower confidence level cannot.

In addition to the ToPs, after authentication each node receives the associated IEEE 802.11i group key from the authentication server. This key is transmitted by means of a Pairwise Master Key (PMK) that is sent from the authentication server to the authenticating node. The PMK is generated during authentication. Then the node is ready to participate in the MAC Layer Routing Protocol.

For transporting the ToP field, the invention provides for at least one type of integrity protection for the ToP field, for increased security. If the integrity of the ToP field is not secured, new attacks can occur. For example, an attacker can lower the confidence level of a packet so that nodes with another confidence level can read, change, or reject the packet. In addition, such a classification attack can be used to carry out Denial-of-Service attacks on specific nodes or parts of the mesh network. If, for example, a certain ToP value supports only one path through the mesh network and all data traffic is set to this ToP value, that path would quickly be overloaded. This would mean that no further communication on that path, and therefore for that ToP value, would be possible.

Integrity is achieved by using the appropriate ToP group key. This guarantees that nodes which do not have this ToP group key cannot modify the ToP field without damaging the integrity of the packet.

Because some mesh header fields are modified during forwarding, so that their signatures are not valid for integrity protection, variable fields must not be used for generating signatures. Integrity protection for these fields is not provided in that case, or the receiver tries to predict the value of the variable fields, which is often easy to do.

Preferably, the invention provides for the trusted data traffic also to be encrypted using the group key, because due to the characteristics of the wireless transport medium, every node is capable of intercepting the data traffic or inserting its own data traffic. Distribution of the group key per ToP and the use of encryption guarantee that only nodes that have the correct group key can read the packet contents. Interception of trusted data is therefore prevented, which is very important in business environments where visitors can use the WLAN mesh like employees.

In the IEEE Computer Society, IEEE Standard for Local and Metropolitan Area Networks, Specific Requirements, Part 11: Wireless LAN Medium Access Control (MAC) and Physical Layer (PHY) Specifications, June 2007, the Robust Secure Network (RSN) protocol is described, which is used for secure communication in an IEEE 802.11 network. RSN normally protects only frames that are exchanged between the station and the access point, but the multi-hop case is not described in the IEEE 802.11 standard.

The invention proposes to expand the RSN concept to multi-hop mesh networks. This involves a change to the mechanism for key distribution as well as authentication, which in particular guarantees protection of point-to-point communication. In this way, a supplicant, which is a newly added node, in order to access the network resources, must be authenticated on the network. Authentication is done by the authenticator, typically an access point in infrastructure mode, which tests the supplicant's authenticity using an authentication server and grants or refuses access to the services requested through the authenticator. A ToP value is assigned at this point.

Authentication between the supplicant and the authentication server can be based on a group key or can be per IEEE 802.1x, as stated in IEEE Computer Society, IEEE Standard for Local and Metropolitan Area Networks, Port-Based Network Access Control, December 2004, and in the Extensible Authentication Protocol (EAP), as described in B. Aboba, L Blunk, J. Vollbrecht, J. Carlson, and H. Levkowetz, Extensible Authentication Protocol (EAP), IETF, RFC 3748, June 2004. Communication between the authenticator and the authentication server is then possible using a Backend Protocol such as RADIUS, described in C. Rigney, S. Willens, A. Rubens, and W. Simpson, Remote Authentication Dial In User Service (RADIUS), IETF, RFC 2865, June 2000, and secured using a group key between the authenticator and the authentication server. It is mandatory that the supplicant and the authenticator, as well as the authenticator and the authentication server, must not be connected directly to each other, but they can communicate with each other via multiple hops using the mesh network.

Preferably, a new mesh node can be authenticated on an existing mesh network, in which a special node, such as the mesh portal point, is chosen as the authenticator.

FIG. 1 shows an arrangement of 7 mesh nodes A, B, ... G and an authentication server H such as would be found in a small business environment. Node A is a mesh access point that offers a connection to the authentication server or to other networks, e.g., to other mesh networks or directly to the Internet. The other nodes are mesh points or mesh access points. All mesh nodes participate in the MAC layer routing protocol that is used in this particular mesh network. WLAN stations, which are connected to a mesh access point and integrated transparently into the mesh network, are not represented in this figure.

Three confidence levels are defined in this figure and shown as Visitor ToP N1 and Employee ToP N2 or the combination of both N3. Nodes B and F with Visitor ToP N1 are allowed to participate on the mesh network only temporarily and do not belong to the business, so they are assigned a different ToP from that of node G with Employee ToP N2. If each node can be assigned only one ToP, then the network is split up into multiple networks with different confidence levels. This leads to network coverage difficulties and nodes that are likely to be unreachable. Therefore, the assignment of multiple ToPs to one node is permitted, and it allows data packets to be forwarded to nodes with a different ToP. FIG. 1 includes nodes A, C, D, and E with the combined ToP N3 for Employee ToP and also Visitor ToP. This guarantees that these nodes A, C, D, and E can forward all of the data traffic on the mesh network.

The process of authenticating a participating node with authentication server H is indicated by the reference designation T1, wherein after authentication, each node receives its ToP value and the associated group key. Data traffic with the confidence level of a visitor, which contains the Visitor ToP value in the ToP field of the mesh header, is indicated by the reference designation T2. Data traffic with the confidence level of an employee, which contains the Employee ToP value in the ToP field of the mesh header, is indicated by the reference designation T3. Data packets with both confidence levels, Visitor ToP and Employee ToP, are forwarded between nodes A, C, D, and E.

Mesh nodes for which a lower power consumption is desired can preferably reduce their wireless operation by forwarding only data packets with their own confidence level, as illustrated for node G in FIG. 1.

Figure 2:
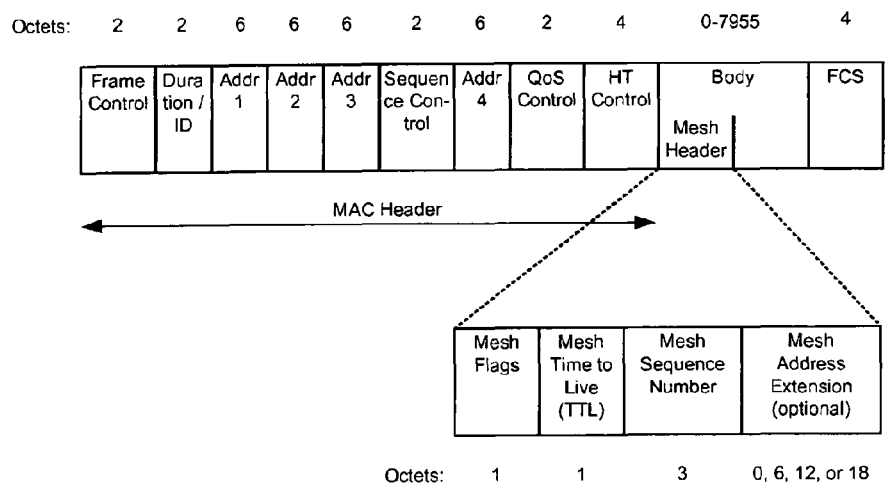
FIG. 2 shows the format of a mesh data packet according to the IEEE 802.11s standard.

FIG. 2 shows the format of a mesh data packet in mesh networks corresponding to standard IEEE 802.11s. Data can either be sent exclusively within a mesh network or can go beyond the limits of the mesh network. The IEEE 802.11 MAC header of a mesh data packet allows for 4 addresses and one additional mesh header, in order to direct the packet through multiple hops to its destination. The mesh header contains the Mesh Sequence Number field, which contains a point-to-point sequence number in order to recognize duplicate and out-of-order frames. If the mesh network interacts with nodes that do not belong to the mesh, it is possible to attach additional addresses in the Mesh Address Extension field by setting the Address Extension Flag in the Mesh Flags field.

Figures 3, 4:
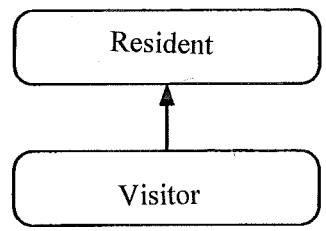
FIG. 3 shows the format of the expanded mesh header with ToP field.
FIG. 4 shows the fully classified confidence levels in a residential environment.

FIG. 3 shows the format of the expanded mesh header. According to the invention, the mesh header described in the IEEE 802.11s standard is expanded to include the Mesh ToP field, which is inserted after the Mesh Address Extension field. An additional ToP flag is defined in the Mesh Flag field and indicates whether or not this Mesh ToP field is contained in the mesh header.

FIG. 4 shows an example of two fully classified confidence levels in a residential environment. The data traffic designated as ToP Resident is only forwarded to nodes with the Resident confidence level. If security is ensured by encrypting, then this traffic cannot be read by a node with the Visitor ToP. Packets secured with the Visitor ToP can be forwarded and read by every node in the mesh network, because due to the complete classification of the confidence level hierarchy, every node with the Resident ToP also receives the Visitor ToP. This makes resident nodes more trusted than visitor nodes.

Figure 5:
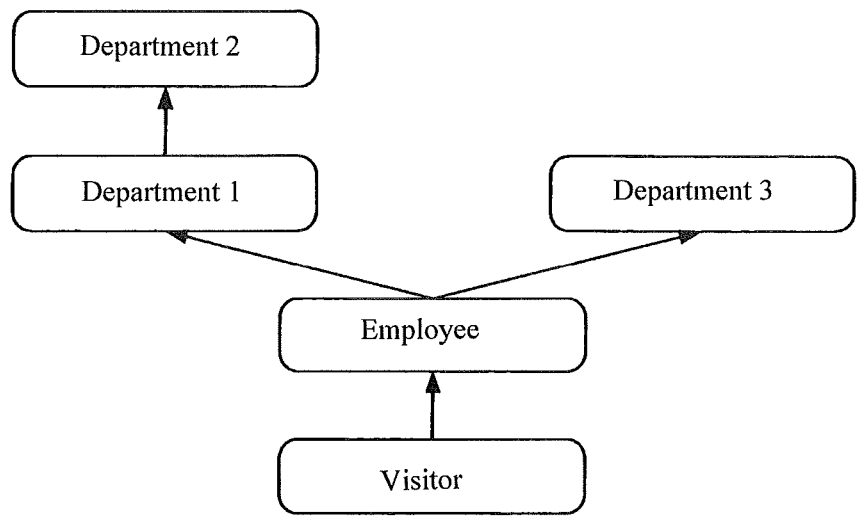
FIG. 5 shows the partially classified confidence levels in a business environment.

FIG. 5 shows an example of multiple partially classified confidence levels, as they could be used in large business mesh networks for a company. The nodes with the Visitor ToP are the least trusted. The nodes with the Employee ToP are divided into various departments of the company. Departments 1 and 2 are fully classified; Department 3 has no connection to the others. In this figure, the company's internal traffic must be protected with at least the Employee ToP. If security is required for the traffic in Department 1, then its ToP must be used; otherwise the employees in Department 3 would also be able to read traffic transmitted with the Employee ToP. Data traffic designated with the Visitor ToP can be forwarded by every node that is participating on the mesh network. However, nodes with the Visitor ToP are able to read and forward only traffic that is protected with the Visitor ToP.

Figure 6:
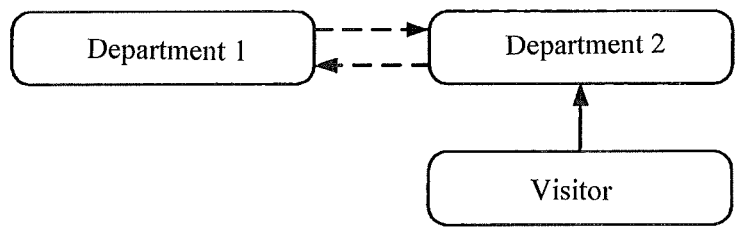
FIG. 6 shows the unclassified confidence levels in a business environment.

FIG. 6 shows an example of unclassified confidence levels in a business environment. Here traffic with the Department 1 ToP can be forwarded by nodes with the Department 2 confidence level and vice versa. However, packets with the Visitor ToP designation are forwarded only by nodes with the Visitor ToP and nodes with the Department 2 ToP. Such an arrangement can be necessary, for example, in order to protect the resources of nodes with the Department 1 ToP.

Figure 7:
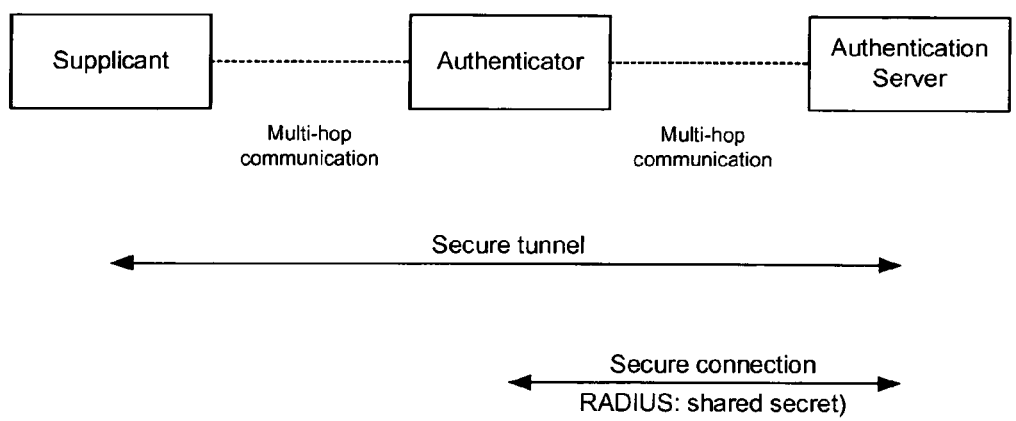
FIG. 7 shows multi-hop authentication in a mesh network.

FIG. 7 shows multi-hop authentication in a mesh network. For authentication of supplicants, a secure connection is made with the authenticator, which tests the supplicant's authenticity with the authentication server. Authentication between the supplicant and the authentication server takes place in a secure tunnel based on a group key or through IEEE 802.1x and the EAP protocol. Communication between the authenticator and the authentication server is accomplished via a Backend protocol such as the RADIUS protocol and secured by a group key between authenticator and authentication server. Communication can thus involve multiple hops in the mesh network.

The invention claimed is:

1. A method for making security mechanisms available in wireless mesh network having a plurality of nodes that are connected to each other in a wireless network using mesh routing and including a mesh header in a MAC layer by multi-hop communication, comprising:
    defining a first Type of Protection (ToP) confidence level for a first node of the plurality of nodes;
    defining a second ToP confidence level for a second node of the plurality of nodes;
    the first node sending a first data packet to the second node that is intended for a third node of the plurality of nodes via a multi-hop connection, the first data packet having a third ToP confidence level defined within a header of the first data packet;
    the second node receiving the first data packet;
    the second node comparing the third ToP confidence level with the second ToP confidence level of the second node to determine whether the first data packet is to be forwarded by the second node,
        upon a determination that the third ToP confidence level indicates that the third ToP confidence level is of a lesser or equal confidence level than the second ToP confidence level, the second node forwarding the received first data packet;
        upon a determination that the third ToP confidence level indicates that the third ToP confidence level is of a greater confidence level than the second ToP confidence level, the second node not forwarding the first data packet.

2. The method of claim 1, wherein upon a determination that the third ToP confidence level indicates the third ToP confidence level is only of the equal confidence level than the second ToP confidence level, the second node forwarding the received first data packet and wherein the method further comprises:
    upon a determination that the third ToP confidence level indicates that the third ToP confidence level is of a lesser confidence level than the second ToP confidence level, the second node not forwarding the first data packet.

3. The method of claim 2, comprising:
    defining a ToP flag in a Mesh Flag field of the header and indicating a presence of the ToP field in the header.

4. The method of claim 1, wherein the header of the first data packet is a mesh header that is expanded by one octet to allow a ToP field to be defined therein, the third ToP confidence level being identified within the ToP field of the header.

5. The method of claim 1, comprising:
    the first node assigning the third ToP confidence level to the first data packet depending on an address of the first node.

6. The method of claim 1, comprising:
    inserting in the second node a forwarding table for ToP confidence levels to list, the second node comparing the third ToP confidence level with the forwarding table to determine whether the first data packet is trustworthy.

7. The method of claim 6, comprising: defining a Path Selection protocol for routing data packets between nodes.

8. The method of claim 1, comprising:
    an authentication server authenticating the first node to accept the first node into the network; and
    the authentication server authenticating the second node to accept the second node into the network.

9. The method of claim 8, comprising:
    assigning, by the authentication server, the first ToP confidence level to the first node and entering the first ToP confidence level in a forwarding table and associating that first ToP confidence level with the first node in the forwarding table for the nodes of the network to refer to; and
    assigning, by the authentication server, the second ToP confidence level to the second node and entering the second ToP confidence level in a forwarding table and associating that second ToP confidence level with the first node in the forwarding table for the nodes of the network to refer to.

10. The method of claim 1, wherein the first ToP confidence level is a first value and the second ToP confidence level is a second value that differs from the first value.

11. The method of claim 10, wherein the first, second, and third ToP confidence levels correspond to classified confidence levels.

12. The method of claim 10, wherein the first ToP confidence level corresponds to a classified confidence level and the second and third ToP confidence levels correspond to unclassified confidence levels.

13. The method of claim 10, wherein the first, second, and third ToP confidence levels correspond to unclassified confidence levels.

14. The method of claim 8, comprising:
assigning, by the authentication server, an associated group key to the first node and the second node according to an IEEE 802.11i-2007 standard.

15. The method of claim 14, comprising:
protecting the integrity of a ToP field of the first data packet by a group key and by signature generation.

16. The method of claim 15, wherein variable fields in the header that are modified during forwarding are not used in signature generation.

17. The method of claim 14, comprising:
accessing the group key for cryptographic protection of the first data packet.

18. The method of claim 8, comprising:
expanding a Robust Secure Network (RSN) protocol to include authentication of new nodes to the network and to establish secure multi-hop communication.

19. The method of claim 18, comprising:
authenticating a fourth node in a secure tunnel between the fourth node and the authentication server.

20. The method of claim 18, wherein communication between nodes responsible for key distribution and the authentication server is via a Backend protocol.

21. A mesh network comprising an authentication server and a plurality of wireless nodes connected to each other, the nodes comprising a first node and a second node;
the authentication server assigning a first Type of Protection (ToP) confidence level for a first node of the plurality of nodes;
the authentication server assigning a second ToP confidence level for a second node of the plurality of nodes;
the first node sending a first data packet to the second node that is intended for a third node of the plurality of nodes via a multi-hop connection, the first data packet having a third ToP confidence level defined within a header of the first data packet;
the second node receiving the first data packet;
the second node comparing the third ToP confidence level with the second ToP confidence level of the second node to determine whether the first data packet is to be forwarded by the second node,
upon a determination that the third ToP confidence level indicates that the third ToP confidence level is of a lesser or equal confidence level than the second ToP confidence level, the second node forwarding the received first data packet;
upon a determination that the third ToP confidence level indicates that the third ToP confidence level is of a greater confidence level than the second ToP confidence level, the second node not forwarding the first data packet.

* * * * *